No. 670,350. Patented Mar. 19, 1901.
B. SCHWERIN.
ELECTRO ENDOSMOTIC PROCESS OF FREEING MATERIALS FROM FLUIDS.
(Application filed July 26, 1900.)
(No Model.)
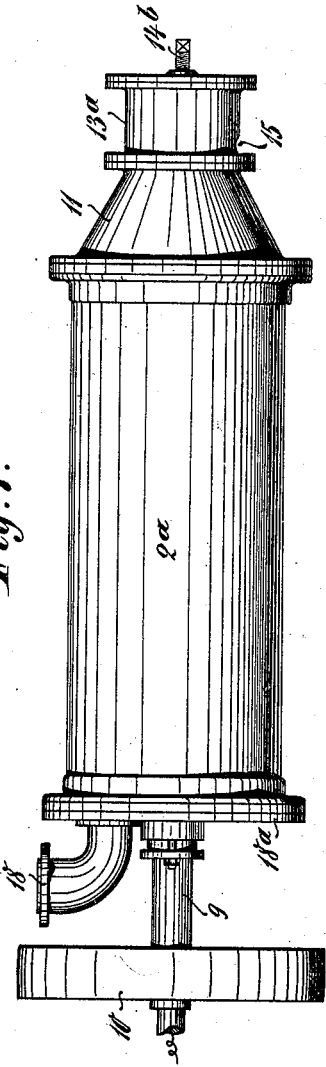
Witnesses
Marcus L. Byng.
Osgood R. Dowell
Inventor
Botho Schwerin
By Gillian R. Dowell
His Attorney.

UNITED STATES PATENT OFFICE.

BOTHO SCHWERIN, OF MUNICH, GERMANY.

ELECTRO-ENDOSMOTIC PROCESS OF FREEING MATERIALS FROM FLUIDS.

SPECIFICATION forming part of Letters Patent No. 670,350, dated March 19, 1901.

Application filed July 26, 1900. Serial No. 24,953. (No specimens.)

*To all whom it may concern:*

Be it known that I, BOTHO SCHWERIN, a subject of the King of Prussia, Emperor of Germany, residing at No. 6 Prinz-Ludwig-Strasse, Munich, Bavaria, German Empire have invented a new and useful Electro-Endosmotic Process of Freeing Materials from Fluids; and I do hereby declare that the following is a full, clear, and exact description of my invention, which will enable others skilled in the art to which it appertains to make and use the same.

This invention relates to the elimination of water or other fluids from solid mineral, vegetable, and animal substances; and its main object is to prevent impermeable crusts from being formed, so that a more efficient effect is produced even when operating upon materials which possess the property of mechanically binding with energy a great percentage of their fluid, such as peat and the like.

With many substances the ordinary mechanical removal of fluids therefrom or the removal by means of presses, centrifugal apparatus, and the like results in the formation of impermeable crusts, whereby further escape of fluid is prevented. This formation of impermeable crusts renders, for instance, the mechanical removal of fluid a very imperfect process when operated upon substances which possess the property of mechanically binding a great percentage of their water or other fluid, such as peat and the like, and consequently require a very strong pressure to be applied. With substances of this kind the amount of energy to be applied is entirely out of proportion to the effect produced. In order to do away with this difficulty, the present invention makes use of the so-called "electro-endosmotic" principle.

It is well known to electricians that the electric current is capable of exerting a motorial action upon fluids provided a porous diaphragm be inserted in the fluid between electrodes of opposite sign. With this interposition of the diaphragm, an electric current being passed through the liquid, the molecules of the latter are caused to travel from the positive electrode to the negative one, where the liquid accumulates. This phenomenon is called "electro-osmose" or "electro-endosmose." Now I have found that the same effect is obtained when a disintegrated material which contains or is impregnated or intermixed with fluid is placed in contact with electrodes of opposite denomination, the solid constituents of the material acting as the diaphragm above mentioned as soon as the circuit is closed.

This invention therefore consists in utilizing the said motorial action of the electric current for freeing solid mineral, vegetable, and animal materials from water or other fluids as follows: The material to be treated is brought in contact with positive and negative electrodes by placing or moving it between the same, an electric current passed through it by means of said electrodes, and the fluid allowed to discharge at the negative electrode, the material being preferably operated upon in the state of a pulp, sludge, mud, or slime. While the electric circuit is closed the molecules of the water or other fluid diffuse from solid particles to solid particles toward the negative electrode, where they are allowed to escape to the outside, for instance, by rendering said electrode permeable to liquids. In this manner a high percentage of fluid can be eliminated from the material without giving rise to the formation of crusts.

In order to insure efficient contact between the material and the electrodes, such an amount of pressure may be applied as will not result in the formation of dense crusts. As this pressure exerts a driving-out action, the amount of current to be applied can be smaller accordingly.

When practicable, the material should be caused at shorter or longer intervals to pass from the negative electrode to the positive one, and vice versa, in order to prevent the formation of too dry a layer of material in front of the positive electrode.

The strength of the electric current to be applied is dependent upon the nature of the fluid to be removed and must therefore be determined by experiments for each material.

The process is applicable to any material provided it be operated upon in a sufficient state of disintegration—for instance, forming a pulp, sludge, mud, or slime, or a wet, moist, or drenched mass of slices or other fragments, and the like. As mere illustrative examples may serve—for instance, wood-pulp, starchpulp, ground peat, disintegrated fruits, clay sludge, potatoes or beet-roots reduced to slices or pulp, disintegrated fish or flesh, crushed seeds, and the like—therefore I wish it to be understood that the term "disintegrated" as used in this specification and its annexed claims is intended to express in a broad sense any sufficient degree of subdivision brought about by any process—as, for instance, by grinding, comminuting, crushing, cutting, washing, boiling, and the like.

The extraction of water from peat to a very high degree can, for example, be effected by grinding the peat to a thick "sludge" or paste-like mass and placing the same in a box subdivided into compartments, such as the usual peat-mold, having a bottom made out of a substance being a good conductor of electricity and rendered permeable to liquid—such as, for instance, a wire-gauze, perforated plate, or the like—and to which bottom is connected the negative pole of the source of electricity, while the upper surface of the material is connected with the positive pole by means of superposed metal plates or chains hanging down from a pole-piece and reposing on said surface. If now an electric current is caused to pass through the peat, water begins at once to escape through the bottom of the box, while in the various compartments of the box the contained peat gradually contracts, but retains a brick-like shape. The current is allowed to act until the desired degree of dehydration is attained and is then interrupted, when the box can be emptied by simply turning it over. A number of such boxes may, if desired, be arranged upon a rotary circular step-stand rotating at such a speed that after a complete revolution the peat contained in the box arriving at the starting-point has been sufficiently dehydrated and can then be either discharged and replaced by a fresh charge or the box may be removed and a ready-filled one put in its place.

An apparatus for continuous working is shown on the annexed sheet of drawings, of which—

Figure 1 is an elevation of the apparatus; Fig. 2, a vertical central section through the same; and Fig. 3, a cross-section on line $a$ $a$, Fig. 2.

1 and 2, Figs. 2 and 3, are two stationary cylinders coaxially placed one in the other in horizontal position. The inner cylinder 1 constitutes the positive electrode and the outer one, 2, the negative electrode. The latter is so constructed as to be permeable to the fluid to be driven out—for instance, with wire-gauze or perforated sheet metal provided with an external coating of suitable filtering material, as canvas or cloth $2^a$. The inner electrode is supported by a stationary shaft 3, extending in the common axial line of both electrodes, of which the outer one is supported by standards, (not shown,) both electrodes being carefully isolated from adjacent parts, as indicated in Fig. 2 by thick black lines. In the annular interval between the electrodes 1 and 2 is located a spiral 4, extending through the whole length of said interval and constructed with a suitable non-conductive substance or with metal covered with such substance at all points. It is rigidly connected by longitudinal bolts 5 with two disks 6 and 7, both of which are loosely mounted by the respective sleeve-like hubs 8 and 9 upon the shaft 3. The hub or sleeve 9 carries a belt-pulley 10 for imparting rotary motion to the spiral 4. Opposite this pulley the apparatus is closed by a plate $18^a$, carrying a bent pipe 18, which communicates through an opening in said plate with the interval between the cylindrical electrodes 1 and 2. This pipe 18 is the inlet for the material to be treated and is to be connected with a feed-pump, (not shown,) the material being reduced to the state of a mud, sludge, slime, or pulp. At the opposite end of the apparatus the outer cylinder 2 has adapted to it, with the interposition of an insulating-ring, a hollow extension 11 in the form of a truncated cone and provided in its top with a centrally-located opening 12. In front of the outside of this opening is arranged a sliding disk 13, guided by the wall of a cylindrical housing $13^a$, and between the disk and a disk $14^a$, which is adjustable by means of a screw $14^b$, is located a spiral spring 14, which tends to close the plate 13 upon the opening 12 with a pressure depending upon the adjustment of disk $14^a$. In the under side of the housing $13^a$ is provided an opening 15, constituting the outlet proper for the material treated. To the spiral 4 are secured upright plates 16 and $16^a$ in an oblique position, as shown in Fig. 3. The plates 16 extend from the outer edge of the spiral toward the inner edge of same, having an interval between their inner edges and the inner edge of the spiral, while the plates $16^a$ extend from the inner edge of the spiral toward the outer edge of same, leaving an interval between their outer edges and the outer edge of the spiral. Within the conical extension 11 a short screw-blade or spiral 17 is secured to the hub or sleeve 8.

19 and 20 are binding-screws for connecting the electrodes 1 and 2 with the source of electricity. (Not shown.)

The operation of this apparatus is as follows: The peat-pulp or pulp of other material is fed through the pipe 18 into the annular space between the two cylindrical electrodes 1 and 2. Supposing the electrodes in connection with the source of electricity, when the pulp reaches the electrodes the electrical circuit is at once closed, current passes through the pulp, and water begins to percolate through the outer cylinder 2. The spiral 4 is then caused to rotate, when the pulp is conveyed toward the opening 12, where it is first arrested by the spring-controlled plate 13 closing said opening until the pressure of the material causes the plate 13 to recede a distance dependent on the adjustment of spring 14, when the material finds its way past the plate 13 through the annular interval formed between this plate and the edge of the opening 12 and is finally discharged through the opening 15. According to the adjustment of spring 13 a greater or smaller counter-pressure is opposed to the travel of the material and thereby good contact secured between the latter and the electrodes. During its passage through the apparatus the material is repeatedly acted upon by the plates 16 and 16$^a$, causing it to pass from the outer electrode 2 to the inner electrode 1, and vice versa, so that a too-dry layer of material is prevented from forming in front of the positive electrode 1.

What I claim as my invention is—

1. The process of freeing mineral, vegetal and animal materials from fluid which consists in placing the disintegrated material in contact with electrodes of opposite sign, driving the fluid toward the negative electrode by passing an electric current through the material by means of said electrodes, and causing the fluid to discharge from the negative electrode as it is driven out of the material, substantially as and for the purpose stated.

2. The process of freeing mineral, vegetal and animal materials from fluid which consists in placing the disintegrated material in contact with electrodes of opposite signs, driving the fluid toward the negative electrode by passing an electric current through the material by means of said electrodes, exerting pressure upon the material while under the action of the current, and causing the fluid to discharge from the negative electrode as it is driven out of the material, substantially as and for the purpose stated.

3. The process of freeing mineral, vegetal and animal materials from fluid, which consists in placing the disintegrated material in contact with electrodes of opposite signs, driving the fluid toward the negative electrode by passing an electric current through the material by means of said electrodes, exerting pressure upon the material and transferring it from the negative electrode to the positive one, and vice versa, while under the action of the current, and causing the fluid to discharge from the negative electrode as it is driven out of the material, substantially as and for the purpose stated.

4. The process of freeing mineral, vegetal and animal materials from fluid which consists in reducing the material to a pulpy mass, causing the same to travel between electrodes of opposite signs in contact therewith, driving the fluid toward the negative electrode by passing an electric current through the mass by means of said electrodes, exerting a counter-pressure upon the traveling mass and transferring it from the negative electrode to the positive one and vice versa while under the action of the current, and causing the fluid to discharge from the negative electrode as it is driven out of the material, substantially as and for the purpose stated.

In testimony whereof I have hereunto set my hand in presence of two subscribing witnesses.

BOTHO SCHWERIN.

Witnesses:
WALLY SEITZ,
HECK KACHEL.